(12) United States Patent  (10) Patent No.: US 7,731,225 B2
Yoshida  (45) Date of Patent: Jun. 8, 2010

(54) AIRBAG APPARATUS FOR VEHICLE

(75) Inventor: Mitsuhiro Yoshida, Fuji (JP)

(73) Assignee: Nihon Plast Co., Ltd. (JP)

( * ) Notice: Subject to any disclaimer, the term of this patent is extended or adjusted under 35 U.S.C. 154(b) by 343 days.

(21) Appl. No.: 11/633,428

(22) Filed: Dec. 5, 2006

(65) Prior Publication Data

US 2007/0126221 A1 Jun. 7, 2007

(30) Foreign Application Priority Data

Dec. 7, 2005 (JP) ............................ P2005-353740

(51) Int. Cl.
*B60R 21/021* (2006.01)
(52) U.S. Cl. ................. 280/730.2; 280/743.1
(58) Field of Classification Search .............. 280/730.2, 280/743.2
See application file for complete search history.

(56) References Cited

U.S. PATENT DOCUMENTS 6,168,191 B1 * 1/2001 Webber et al. ........... 280/730.2
6,447,005 B2 * 9/2002 Alb et al. ................. 280/730.2
6,626,456 B2 * 9/2003 Terbu et al. .............. 280/728.2
7,083,188 B2 * 8/2006 Henderson et al. ....... 280/730.2
7,314,233 B2 * 1/2008 Kino et al. ............... 280/730.2
2005/0110256 A1 * 5/2005 Crookston et al. ....... 280/743.1
2005/0218639 A1 10/2005 Maertens et al.

FOREIGN PATENT DOCUMENTS

EP 1 314 618 A2 5/2003
JP 2001-171464 6/2001

* cited by examiner

*Primary Examiner*—Paul N. Dickson
*Assistant Examiner*—Timothy Wilhelm
(74) *Attorney, Agent, or Firm*—NDQ&M Watchstone LLP (57) ABSTRACT

In an airbag provided in a folded condition, a front end of the airbag includes a pulled-out section provided by pulling out the end of the airbag. In the airbag in a stored condition, an oblique path from a front end of the airbag to a fixed point of a front pillar can be reached by the pulled-out section. In the developed condition of the airbag, the pulled-out section can further draw the position of the front end of the airbag to the front side, thereby providing an increased protection range by the airbag.

7 Claims, 10 Drawing Sheets

AIRBAG APPARATUS FOR VEHICLE

BACKGROUND OF THE INVENTION

1. Field of the Invention

The present invention relates to an airbag apparatus for a vehicle.

2. Description of Related Art

An upper part of a vehicle body of an automobile includes an airbag that protects, when the automobile is subjected to a side impact, the head of an occupant by being developed in a downward direction. A front end of a lower end of the airbag is joined to one end of a strap. The other end of the strap is joined to a fixed point of a front pillar. In some structures, a rear end of an airbag may be connected to a rear pillar by a strap.

When an airbag is developed, a front end of the airbag is connected to a front pillar by a substantially horizontal strap to prevent the front end of the airbag in the developed condition from being withdrawn. The airbag is stored in a vehicle body in a folded condition in which the airbag is wound from the lower end. A strap is provided toward the fixed point in an obliquely downward direction from the front end of the wound airbag to extend along the front pillar (see Japanese Patent Unexamined Publication No. 2001-171464).

SUMMARY OF THE INVENTION

In the conventional technique as described above, when an airbag is folded in a stored condition, the strap extends along the front pillar from the fixed point of the front pillar toward the front end of the airbag in an obliquely upper direction. When the airbag is developed at a vehicle collision on the other hand, the strap straightly extends from the fixed point of the front pillar toward the rear side in a horizontal manner. This causes the position of the rear end of the strap joined to the front end of the airbag in the stored condition to be positioned at a rear position than that in the developed condition. This causes a proportional deterioration of the function of the strap for preventing the position of the front end of the airbag from being withdrawn. An improvement of this deterioration has been desired.

The present invention has been made in view of the conventional technique as described above.

The airbag apparatus of the present invention includes an airbag that is attached to an upper part of a vehicle body in a folded condition and to which gas from an inflator is injected when a vehicle is subjected to an impact to cause the airbag to be developed in a downward direction. The airbag is folded to provide a folded section so that the airbag having the folded section in a folded condition is provided at an upper part of a vehicle body. A front end or a rear end of the airbag in the folded condition includes a pulled-out section provided by pulling the lower end of the airbag. When the airbag is attached to the upper part of the vehicle body, the pulled-out section is provided along the pillar.

In the present invention, the front end or the rear end of the airbag provided in the folded condition includes the pulled-out section. Thus, an oblique path from the front end of the airbag in the stored condition to the fixed point of the pillar can be reached by the pulled-out section. In the developed condition of the airbag, the pulled-out section can further draw the position of the front end of the airbag to the front side, thereby providing an increased protection range by the airbag.

It is preferable that the airbag apparatus further comprises the strap. The strap connects the front end or the rear end at the lower end of the developed airbag to the fixed point of the pillar in a substantially horizontal direction. The front end or the rear end at the lower end of the developed airbag is connected to the fixed point via the strap. The strap and the pulled-out section are provided along the pillar when the airbag is attached to the upper part of the vehicle body.

In this case, the front end or the rear end of the airbag provided in the folded condition includes the pulled-out section. Thus, an oblique path from the front end of the airbag in the stored condition to the fixed point of the pillar can be reached by the total length of the strap and the pulled-out section. Thus, the length of the strap itself only has to have a short length. In the developed condition of the airbag, the strap can further draw the position of the front end of the airbag to the front side, thereby providing an increased protection range by the airbag.

A base end of the roll section in the airbag preferably includes a pair of double-lapped inflating sections that cover the roll section. This structure allows the double-lapped inflating sections in the developed condition to inflate to push the roll section in a downward direction, thus improving a rate at which the airbag is developed.

The airbag in the folded condition is preferably stored in a wrap cylinder that can be easily cleaved when the airbag is inflated. By this structure, the wrap cylinder maintains the folded condition of the airbag, thus providing an easy handling of the airbag prior to or in the installation of the airbag to the vehicle body. Furthermore, the wrap cylinder that can be easily cleaved allows the airbag during the inflation to be easily developed in a downward direction.

DETAILED DESCRIPTION OF THE INVENTION

Figure 1:
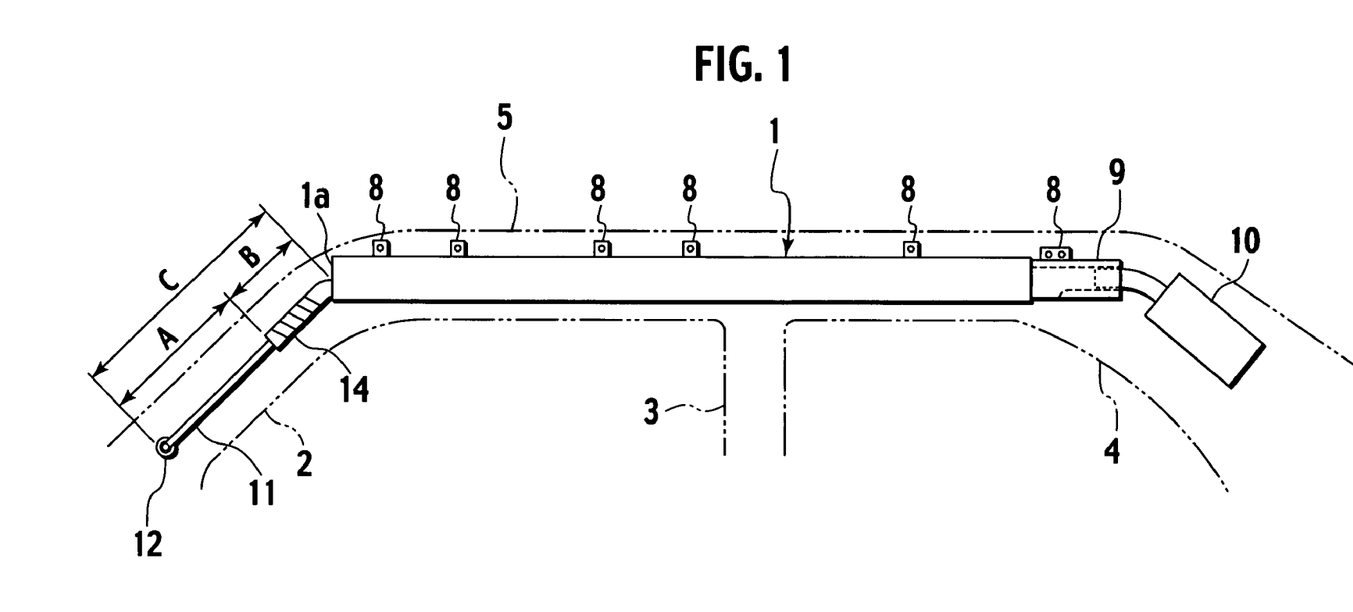
FIG. 1 is a side view illustrating an airbag according to one embodiment of the present invention that is provided at an upper part of a vehicle body in a folded condition.
Figure 2:
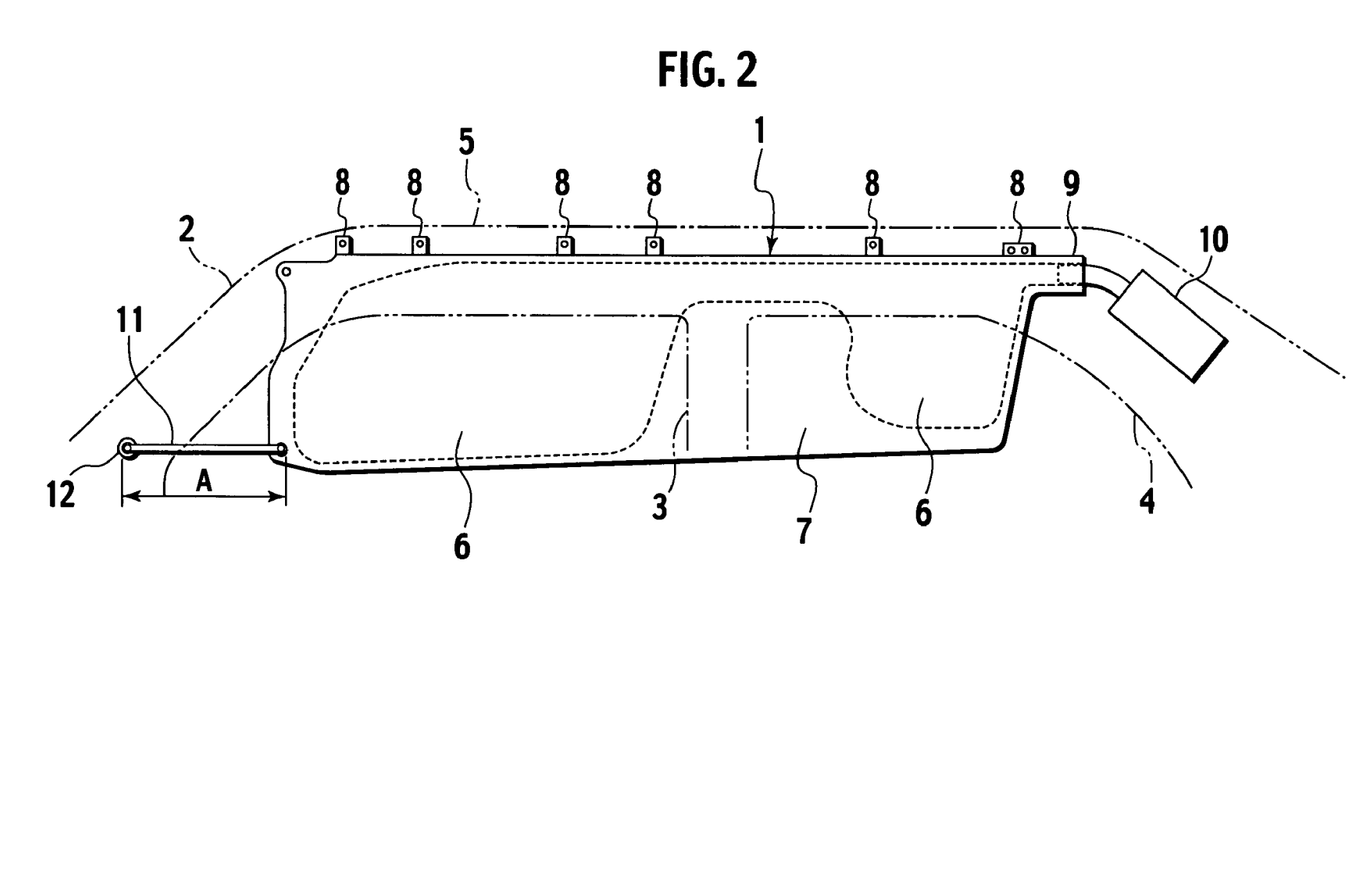
FIG. 2 is a side view illustrating the airbag developed to a lower side in a curtain-like manner.

Hereinafter, embodiments of the present invention will be described with reference to the drawings. FIG. 1 and FIG. 2 illustrate an upper part of an automobile seen from an inner side of a vehicle interior. FIG. 1 shows the condition in which an airbag 1 is not yet developed. FIG. 2 shows the condition in which the airbag 1 is developed. A reference numeral 2 denotes a front pillar, a reference numeral 3 denotes a center pillar, and a reference numeral 4 denotes a rear pillar. At the upper parts of the respective pillars 2, 3, and 4, a side roof rail (vehicle body upper part) 5 is provided along a front-to-end direction.

As shown in FIG. 2, the airbag 1 has a long bag-like shape extending in a front-to-end direction. The airbag 1 is composed of an inflation section 6 divided by a stitching line and a non-inflation section 7 at the outer side of the inflation section 6. An upper end of the airbag 1 includes a plurality of tabs 8. The tab 8 is fixed to the side roof rail 5 via a bracket (not shown). The entire airbag module is covered by interior material (not shown) from the inner side of the vehicle interior. A rear end of the airbag 1 includes a gas filling opening 9. The gas filling opening 9 is connected to an inflator 10.

The front end of the lower end of the airbag 1 is joined to the rear end of a strap 11 having a predetermined size A. The front end of the strap 11 is joined to a fixed point 12 of the front pillar 2. When being in a horizontal condition, the strap 11 joins the front pillar 2 to the airbag 1 to prevent the front end of the airbag 1 in a developed condition from being withdrawn. As shown in FIG. 1, the airbag 1 in a folded condition is provided in the side roof rail 5.

Figure 3:
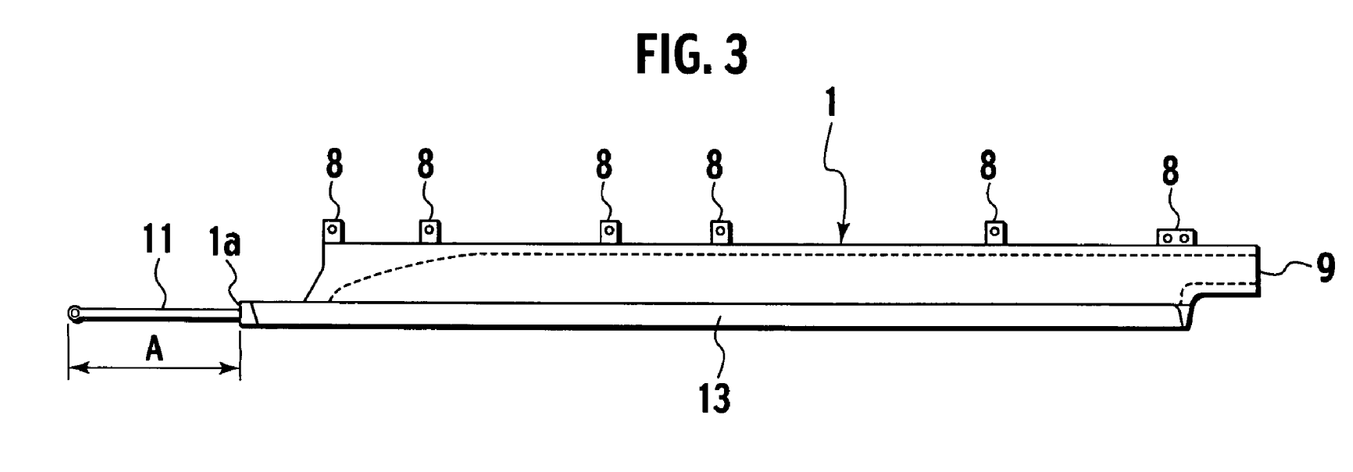
FIG. 3 is a side view illustrating the airbag in which a roll section is wound.
Figure 7:
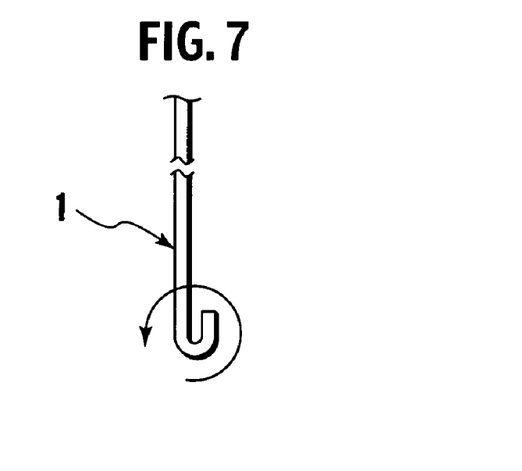
FIG. 7 is a cross-sectional view illustrating the airbag in which the winding of a lower end is started.
Figure 8:
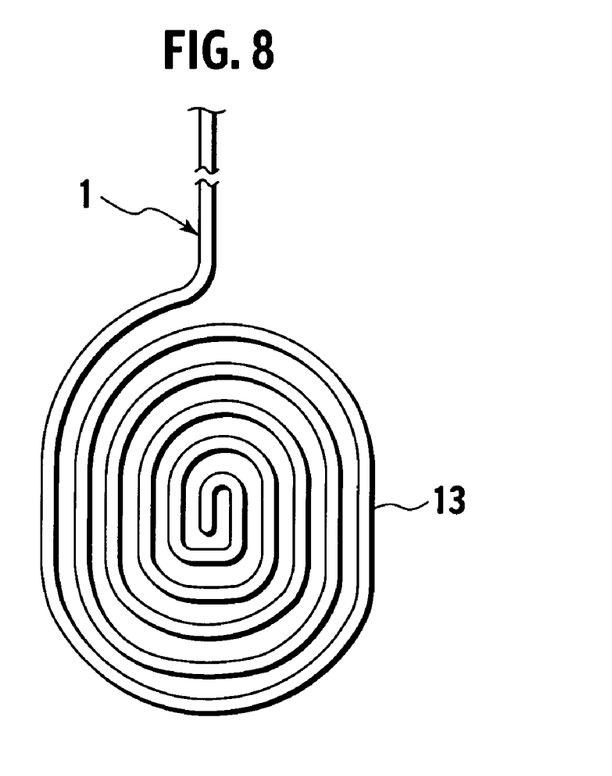
FIG. 8 is a cross-sectional view illustrating the airbag in which a roll section is formed.

Next, how to fold the airbag 1 will be described. First, the entirety of the bag-like airbag 1 is flattened to subsequently sandwich the lower end by a pair of jigs (not shown) as shown in FIG. 7. Thereafter, the airbag 1 is wound as shown in FIG. 3 and FIG. 8 to provide a roll section (folded section) 13. The roll section 13 is not wound tightly but is wound loosely.

Figure 4:
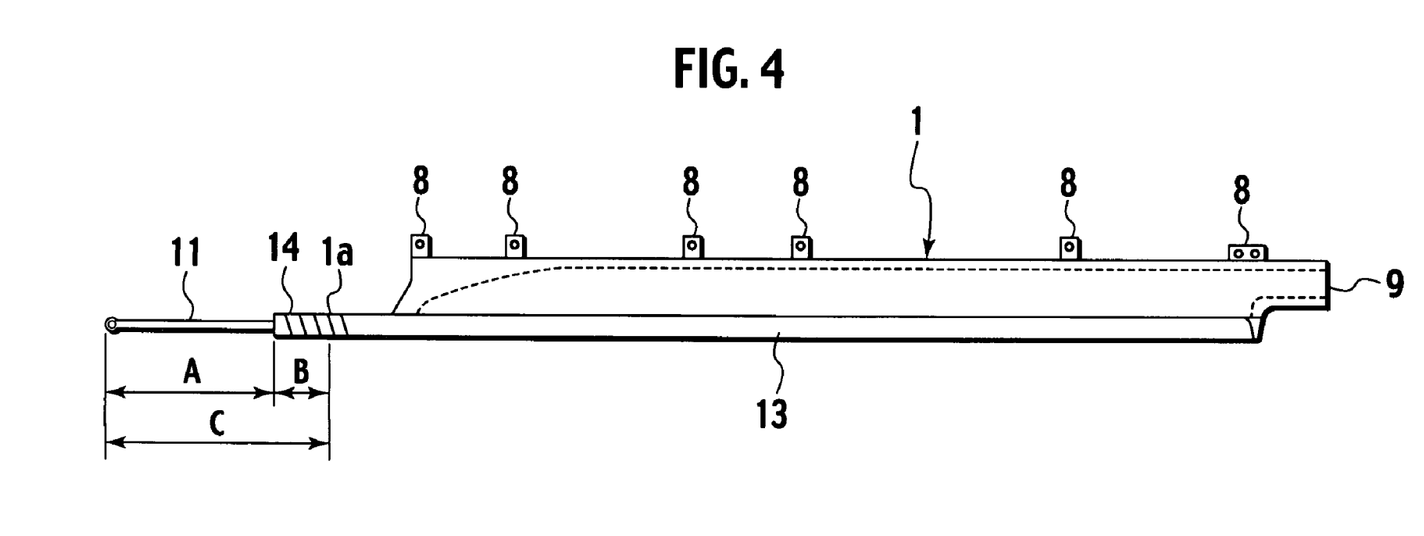
FIG. 4 is a side view illustrating the airbag in which a pulled-out section is drawn from the center of the roll section.

After the formation of the roll section 13, the center of the roll section 13 attached with the strap 11 is drawn to the front side as shown in FIG. 4, thereby providing a pulled-out section 14 having a predetermined size B. In this embodiment, the pulled-out section 14 is formed by pulling out the center of the roll section 13 and then projected spirally.

Figure 5:
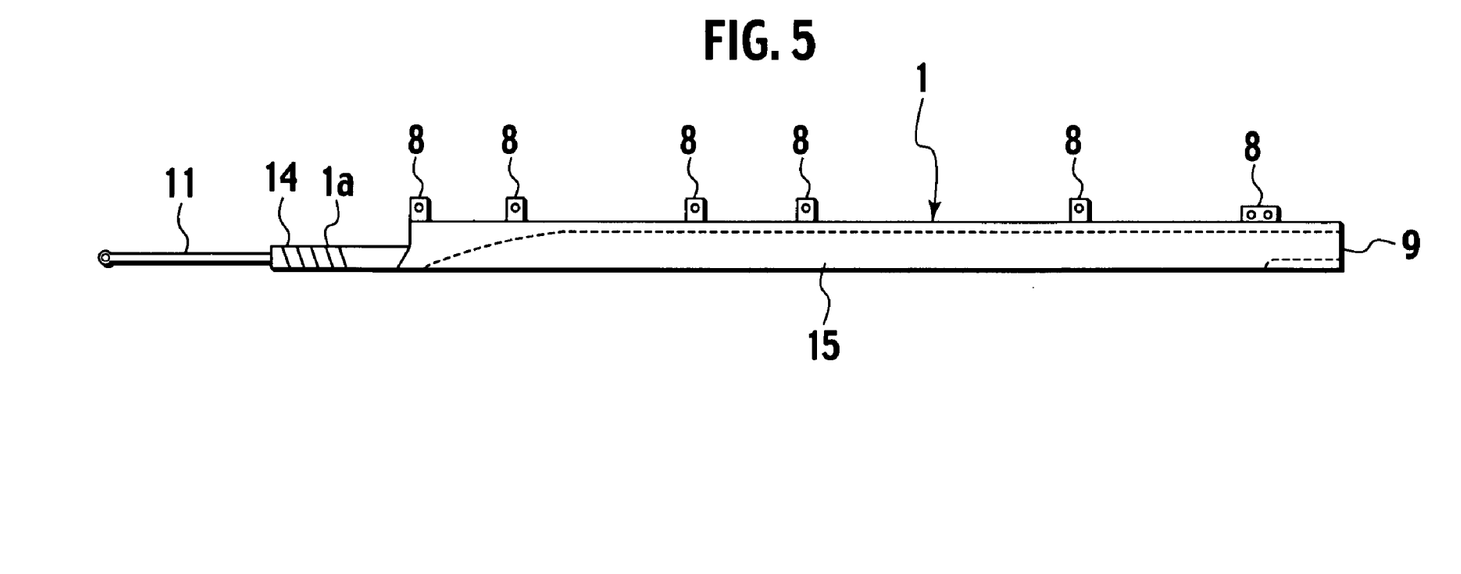
FIG. 5 is a side view illustrating the airbag in which the roll section is covered by double-lapped inflating sections.
Figure 9:
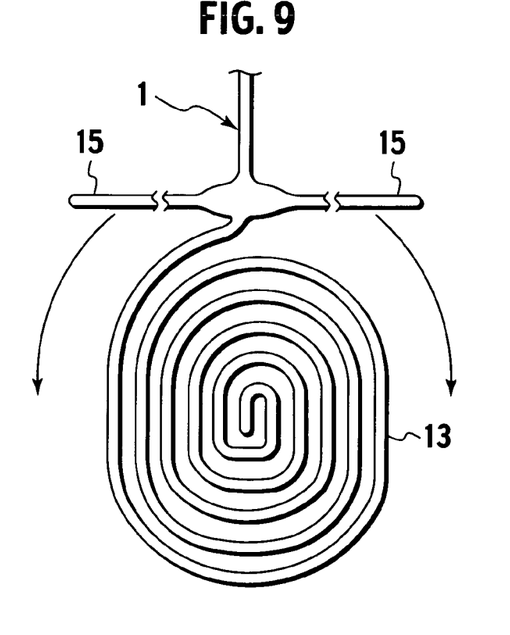
FIG. 9 is a cross-sectional view illustrating the airbag in which the formation of the double-lapped inflating sections is started.
Figure 10:
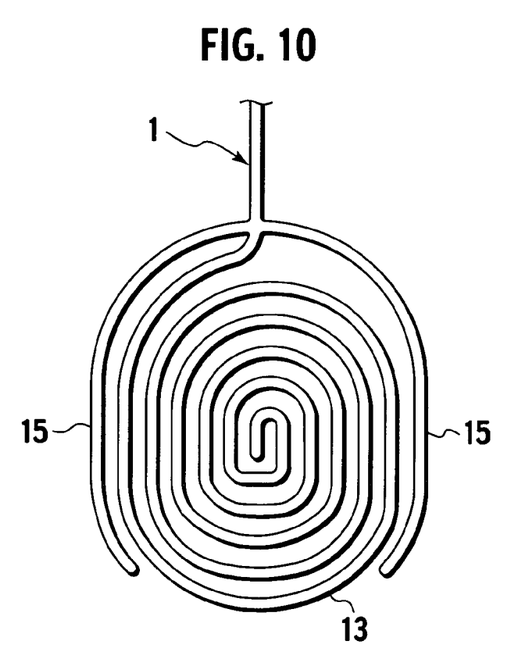
FIG. 10 is a cross-sectional view illustrating the airbag in which the double-lapped inflating sections cover the roll section.

Next, as shown in FIG. 9, foundation cloths at base ends of the roll section 13 are picked up and are drawn in both side directions and are double-lapped, thereby providing a pair of double-lapped inflating sections 15. As shown in FIG. 5 and FIG. 10, the pair of double-lapped inflating sections 15 covers the roll section 13, thereby completing the folded condition.

Figure 6:
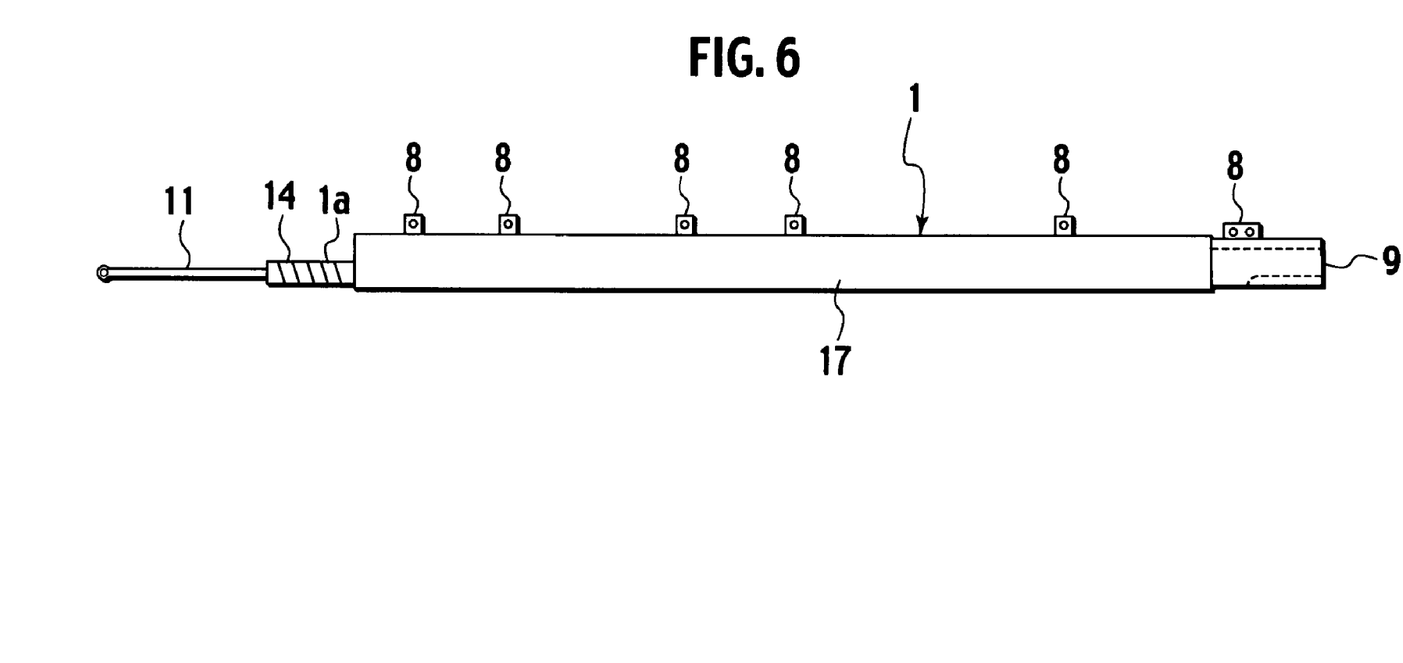
FIG. 6 is a side view illustrating the airbag in which the roll section is covered by the double-lapped inflating sections and that is stored in a wrap cylinder.
Figure 11:
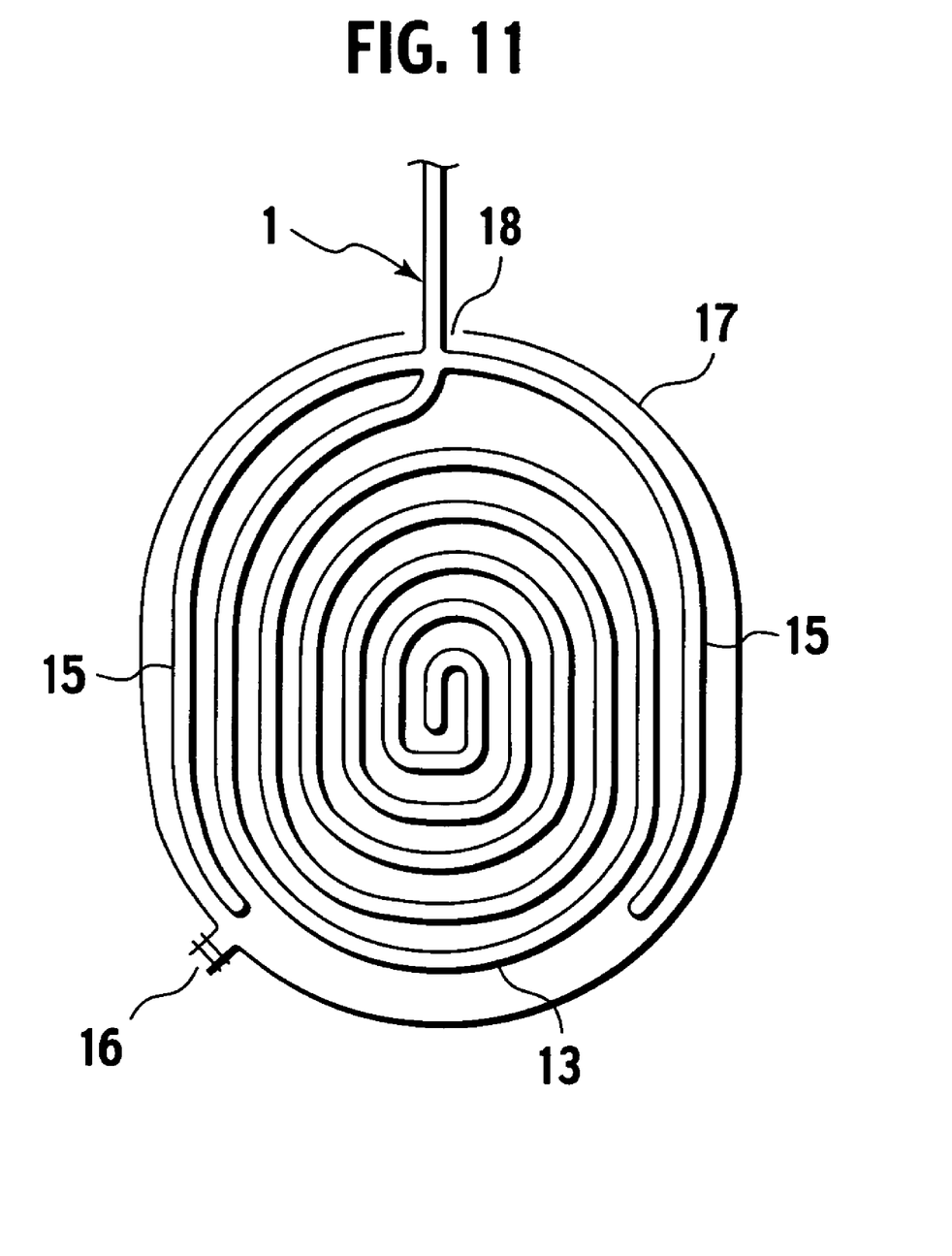
FIG. 11 is a cross-sectional view in which the airbag in which the double-lapped inflating sections cover the roll section is stored in a wrap.

After the completion of the folded condition, the airbag 1 is inserted to a wrap cylinder 17 having a cleavage section 16 in the longitudinal direction as shown in FIG. 6 and FIG. 11 to maintain the folded condition. As shown in FIG. 11, the cleavage section 16 is formed by being sewn. The upper part of the wrap cylinder 17 includes a slit 18 at which the tab 8 is protruded.

The airbag 1 in the folded condition is attached along the side roof rail 5 as described above while being retained in the wrap cylinder 17. As shown in FIG. 1, the pulled-out section 14 having the predetermined size B protrudes in a frontward direction from the front end 1a of the airbag 1 and the strap 11 having a predetermined length A protrudes from the pulled-out section 14 to the front side. A total length C of this pulled-out section 14 and the strap 11 is equal to a distance along the front pillar 2 from the front end 1a of the airbag 1 to the fixed point 12. As described above, the fixed point 12 of the front pillar 2 is reached by the length C of both of the pulled-out section 14 and the strap 11. Thus, the length A of the strap 11 itself is shorter than that of a conventional structure.

When an automobile is subjected to a side impact, gas is injected from the inflator 10 into the airbag 1, thus inflating the airbag 1. The inflation of the airbag 1 allows the cleavage section 16 of the wrap cylinder 17 to be easily cleaved, thus causing the development of the airbag 1.

As described above, the airbag 1 includes the pair of double-lapped inflating sections 15 that is provided at the upper part of the roll section 13 and that covers the roll section 13. Thus, when the airbag 1 is inflated, the double-lapped inflating sections 15 firstly inflate to allow the entirety of the roll section 13 to swiftly push interior material (not shown) to the vehicle interior. This allows the subsequent development of the roll section 13 to be performed in a fast and secure manner. The roll section 13 pushed to the vehicle interior is downwardly developed in a curtain-like manner, thereby protecting an occupant.

According to this embodiment, the front end 1a of the airbag 1 includes the pulled-out section 14 as described above. Thus, an oblique path along the front pillar 2 from the front end 1a of the airbag 1 in the stored condition to the fixed point 12 can be reached by the total length C of the strap 11 and the pulled-out section 14. Thus, the length A of the strap 11 itself only has to have a short length. Furthermore, the strap 11 in the developed condition of the airbag 1 can further draw the position of the front end 1a of the airbag 1 to the front side, thus providing an increased protection range by the developed airbag 1.

Although the above embodiment has shown a structure in which the front end of the airbag 1 is connected to the front pillar 2 by the strap 11, another structure also may be used in which the rear end of the airbag 1 is connected to the rear pillar 4 by the strap 11. The strap 11 is not limited to the shown string-like one and may have any shape so long as the strap 11 is a member connecting the front pillar 2 (rear pillar 4) to the airbag 1.

Although the above embodiment has shown a structure in which the front end of the airbag 1 is connected to the front pillar 2 via the strap 11, another structure also may be used in which the end of the airbag 1 (the end of the pulled-out section 14) is connected to the pillar directly. Alternatively, the strap may be formed by extending the airbag integrally. In this case, the airbag cloth is extended to form the strap (i.e. the end of the integral strap is the end of the airbag).

Figure 12:
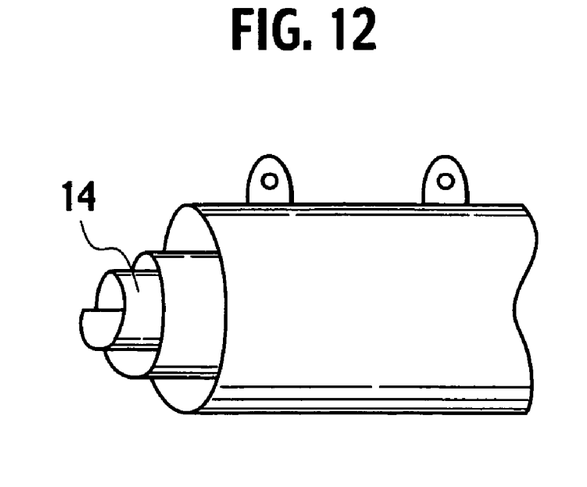
FIG. 12 is a perspective view of the end of the folded section (i.e. the pulled-out section) in a roll-like shape.
Figure 13:
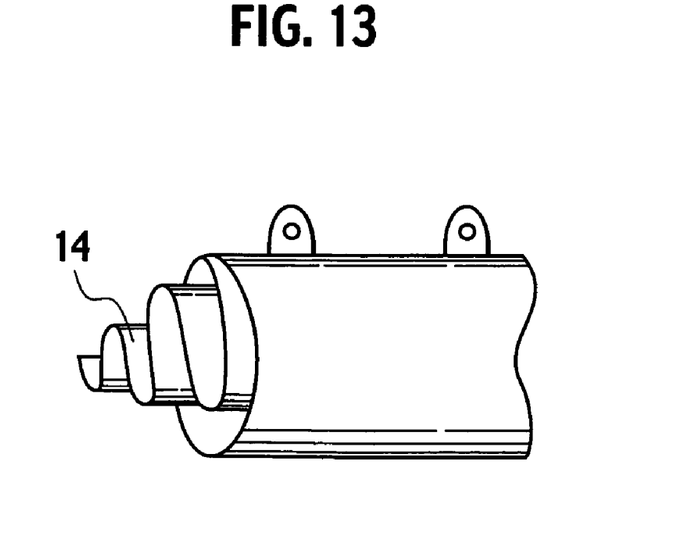
FIG. 13 is a perspective view of the end of the folded section (i.e. the pulled-out section) in a pleats-like shape.

Further, the folded section (the roll section 13 shown in FIG. 12) of the airbag in the above embodiment can be replaced with the folded section shown in FIG. 13. In this case, the folded section is formed by folding up the airbag into concertinas. The airbag in the folded condition has a pleats-like shape. The double-lapped inflating sections 15 can be formed with this case. In addition, the length of the pulled-out section 14 in practice is more longer than the length of the pulled-out section 14 shown in FIGS. 12 and 13. FIGS. 12 and 13 shows the way of folding in outline.

What is claimed is:

1. An airbag apparatus for a vehicle comprising:
    an airbag that is installed at an upper part of a vehicle body in a folded condition and into which gas from an inflator is to be injected when a vehicle is subjected to an impact to develop the airbag in a downward direction; and
    wherein the airbag is folded to form a folded section in the folded condition,
    a front end or a rear end of the airbag is connected to a fixed point on a pillar, the front end or the rear end of the airbag in the folded condition includes a pulled-out section formed by pulling out the front end or the rear end of the airbag in the folded condition, and the pulled-out section extends along the pillar when the airbag is installed at the upper part of the vehicle body.

2. The airbag apparatus according to claim 1, wherein the front end or the rear end is connected to the fixed point via a strap, the strap is to connect the front end or the rear end and the fixed point of the pillar in a substantially horizontal direction in a developed condition on the airbag, and the strap and the pulled-out section extend along the pillar when the airbag is installed at the upper part of the vehicle body.

3. The airbag apparatus according to claim 2, wherein the airbag in the folded condition is wound from a lower end of the airbag to have a roll-like shape, the folded section is formed as a roll section, and the pulled-out section is formed by pulling out the center of the roll section.

4. The airbag apparatus according to claim 3, wherein a base end of the roll section in the airbag includes a pair of double-lapped inflating sections that cover the roll section.

5. The airbag apparatus according to claim 4, wherein the airbag in the folded condition is stored in a wrap cylinder that can be easily cleaved when the airbag is inflated.

6. The airbag apparatus according to claim 2, wherein the airbag in the folded condition is accordion-folded to have a pleats-like shape.

7. The airbag apparatus according to claim 1, wherein the front end or the rear end is connected to the fixed point via a strap, the strap is to connect the front end or the rear end and the fixed point of the pillar in a substantially horizontal direction in a developed condition of the airbag, the strap and the pulled-out section extend along the pillar when the airbag is installed at the upper part of the vehicle body, and a connecting point between an end of the strap and a main body of the airbag is located outside of the folded section of the folded airbag.

* * * * *